INVENTOR.
ARTHUR R. DOUGLASS
BY Bair, Freeman
& Molinare
ATTORNEYS

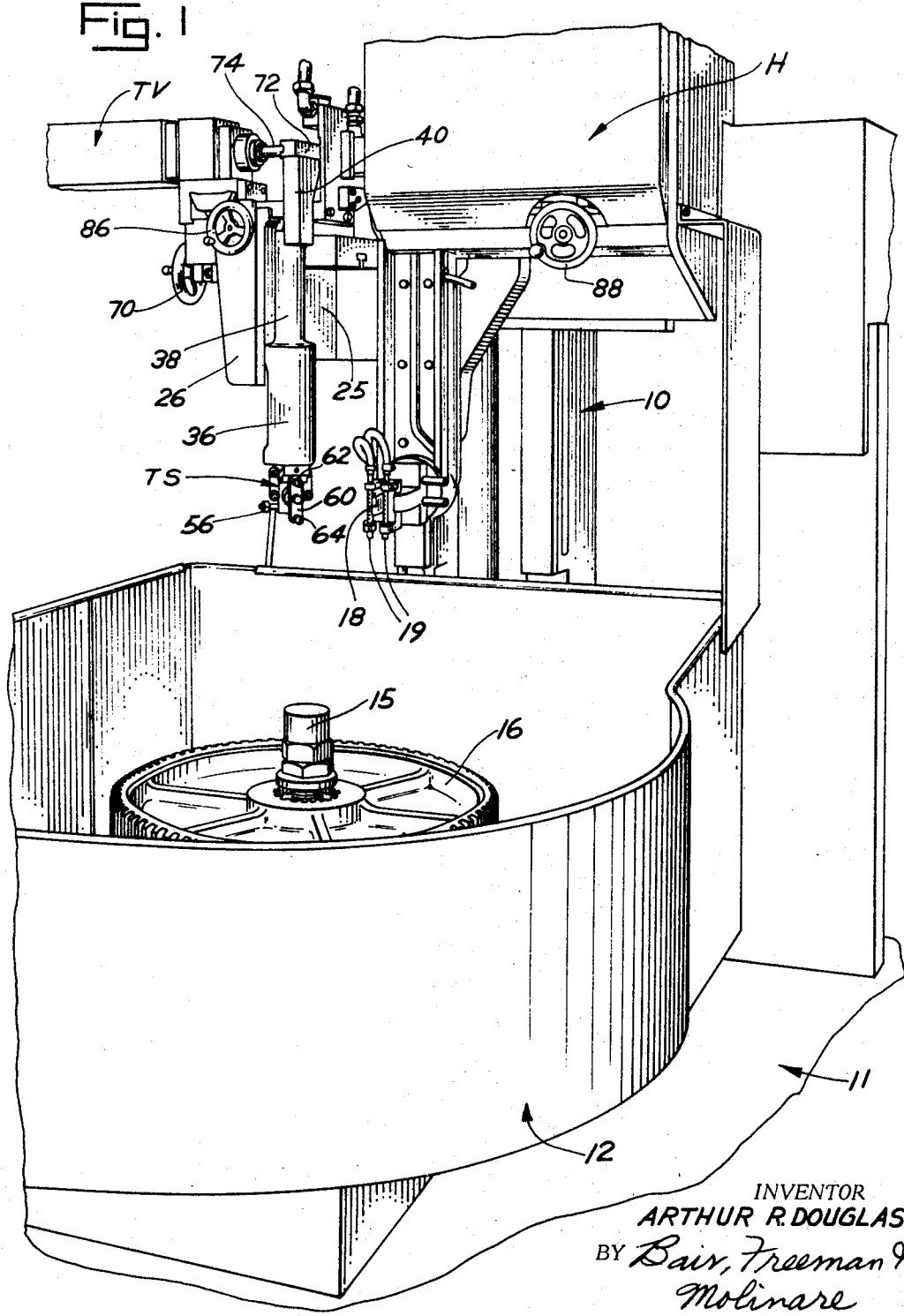

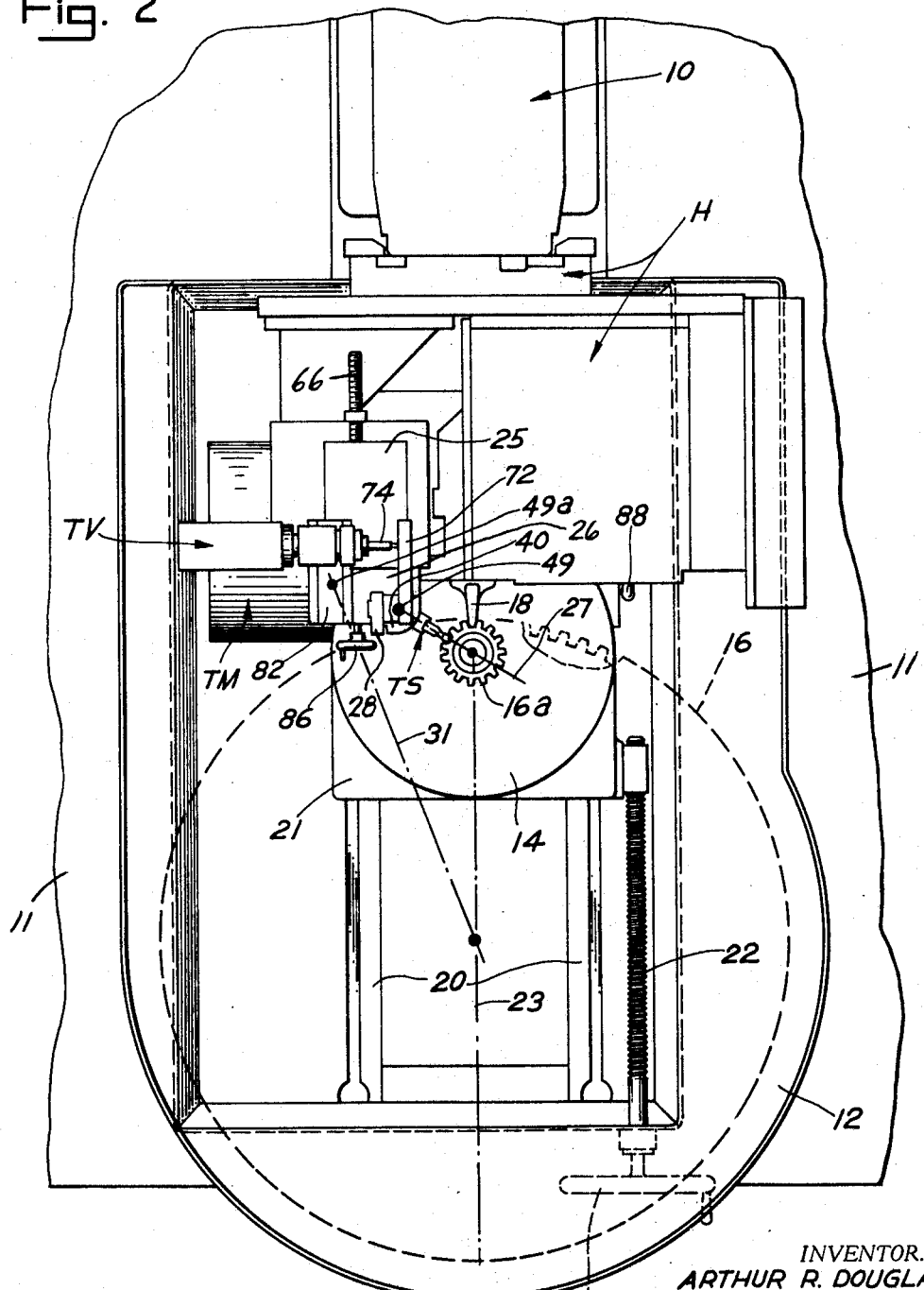

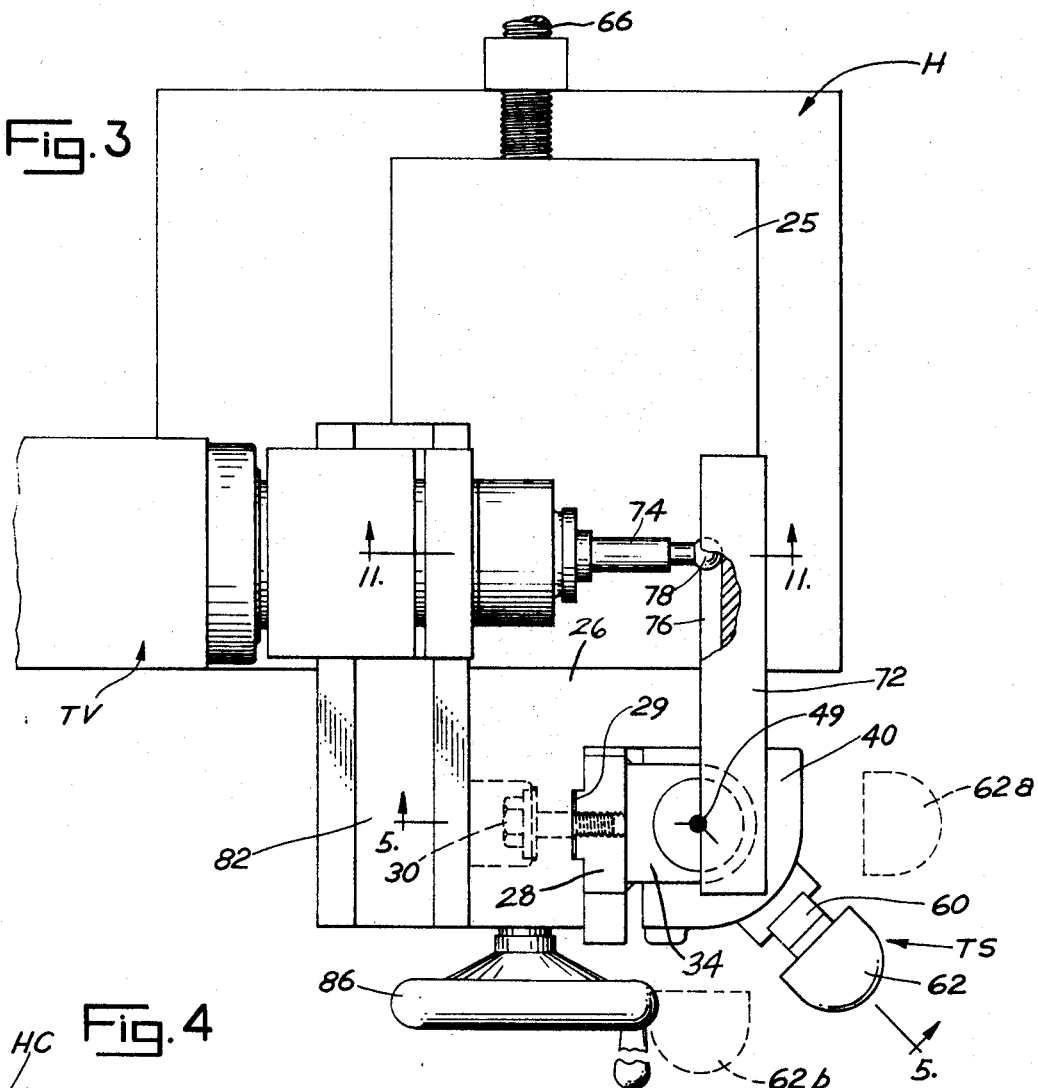
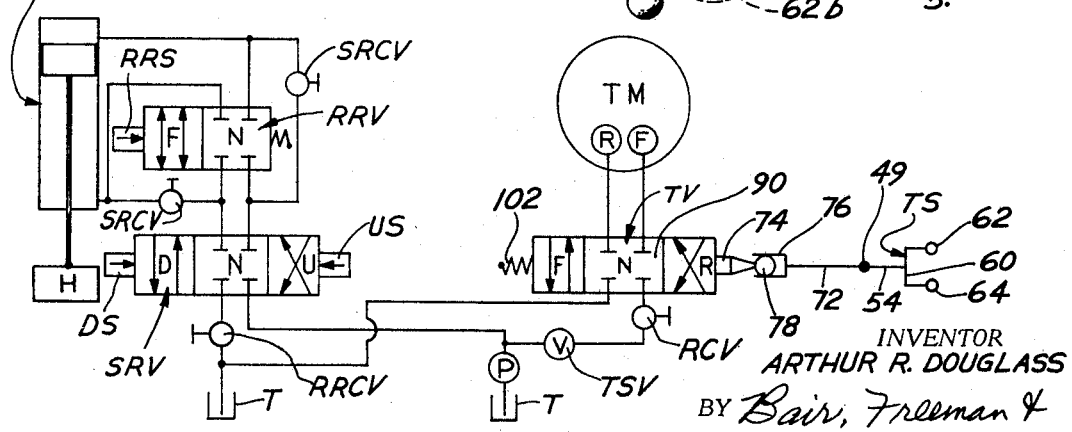

March 24, 1970  A. R. DOUGLASS  3,502,312
GEAR HARDENING MACHINE
Filed Jan. 23, 1967  6 Sheets-Sheet 6

INVENTOR.
ARTHUR R. DOUGLASS
BY Bair, Freeman
& Molinare
ATTORNEYS

United States Patent Office 3,502,312
Patented Mar. 24, 1970

3,502,312
GEAR HARDENING MACHINE
Arthur R. Douglass, Richmond, Ind., assignor to National
Automatic Tool Company, a corporation of Indiana
Filed Jan. 23, 1967, Ser. No. 612,287
Int. Cl. C21d 1/06, 9/32, 1/54
U.S. Cl. 266—5                                  11 Claims

ABSTRACT OF THE DISCLOSURE

An induction hardening machine which includes a tracer stylus responding to the surface of one of several similar surfaces and which is operable to effect accurate guidance of an induction intensifier in properly spaced relation to another of such surfaces.

---

One object of the invention is to provide a gear hardening machine which includes a tracer stylus responding to the surface of one gear tooth and which is operable to effect accurate guidance of an induction intensifier in properly spaced relation to another tooth of the gear.

Another object is to provide mechanism interposed between the tracer stylus and the work piece in order to constantly adjust the position of the work piece with respect to the induction intensifier as such mechanism responds to the tracer stylus as distinguished from mechanical indexing according to Jones Patent No. 2,857,154 or Hunt Patent No. 3,334,881.

Still another object is to provide such mechanism in the form of a reversible power means normally operable in a forward direction to bias the work piece against the tracer stylus, the mechanism for carrying the tracer stylus being in a fixed position with respect to the induction intensifier, and the power means being operable in response to the tracer stylus to keep a surface of the work piece engaged with the stylus, and thereby another surface of the work piece (being hardened by the induction intensifier) in predetermined position with respect to the intensifier.

A further object is to provide the power means in the form of a reversible hydraulic motor normally rotating in a forward direction and controlled by a tracer valve which is shifted to a reverse position if the surface of the work piece being hardened is too close to the intensifier, to a forward position if the spacing is too far and to a neutral position if the spacing is correct.

Still a further object is to provide the tracer stylus arranged for scanning the length of a surface of the work piece and the induction intensifier simultaneously movable therewith for scanning another and similar surface of the work piece which is being hardened by the intensifier, the tracer stylus, at all positions thereof relative to the surface it is tracing, being effective to apply correction in order for the intensifier likewise to be corrected with respect to the surface which it is hardening.

An additional object is to provide the tracer stylus floatingly mounted so that prior to a scanning operation it may engage the end of a gear tooth or the like whereupon it is operable to actuate a tracer valve for the work piece motor and effect a correction of the position of the gear with respect to the induction intensifier before the stylus and the intensifier enter their respective gear tooth gashes.

Another additional object is to provide an induction hardening machine for gear teeth and the like wherein a gear tooth tracer stylus correctly positions an induction intensifier with respect to a gear tooth to be hardened without interfering with the normal cycle of operation of such a machine including the hardening in one direction through a gear gash and hardening in the other direction through another gear gash until all the gear gashes have been hardened and the hardening machine stops operation in response to a counter set for the number of gear teeth.

With these and other objects in view, my invention consists in the construction, arrangement and combination of the various parts of my gear hardening machine, whereby the objects above contemplated are attained, as hereinafter more fully set forth, pointed out in my claims and illustrated in detail on the accompanying drawings, wherein:

FIG. 1 is a perspective view of a gear hardening machine embodying my invention.

FIG. 2 is a plan view thereof.

FIG. 3 is an enlargement of a portion of FIG. 2.

FIG. 4 is a hydraulic diagram showing the control of certain elements of my gear hardening machine.

Figure 5:
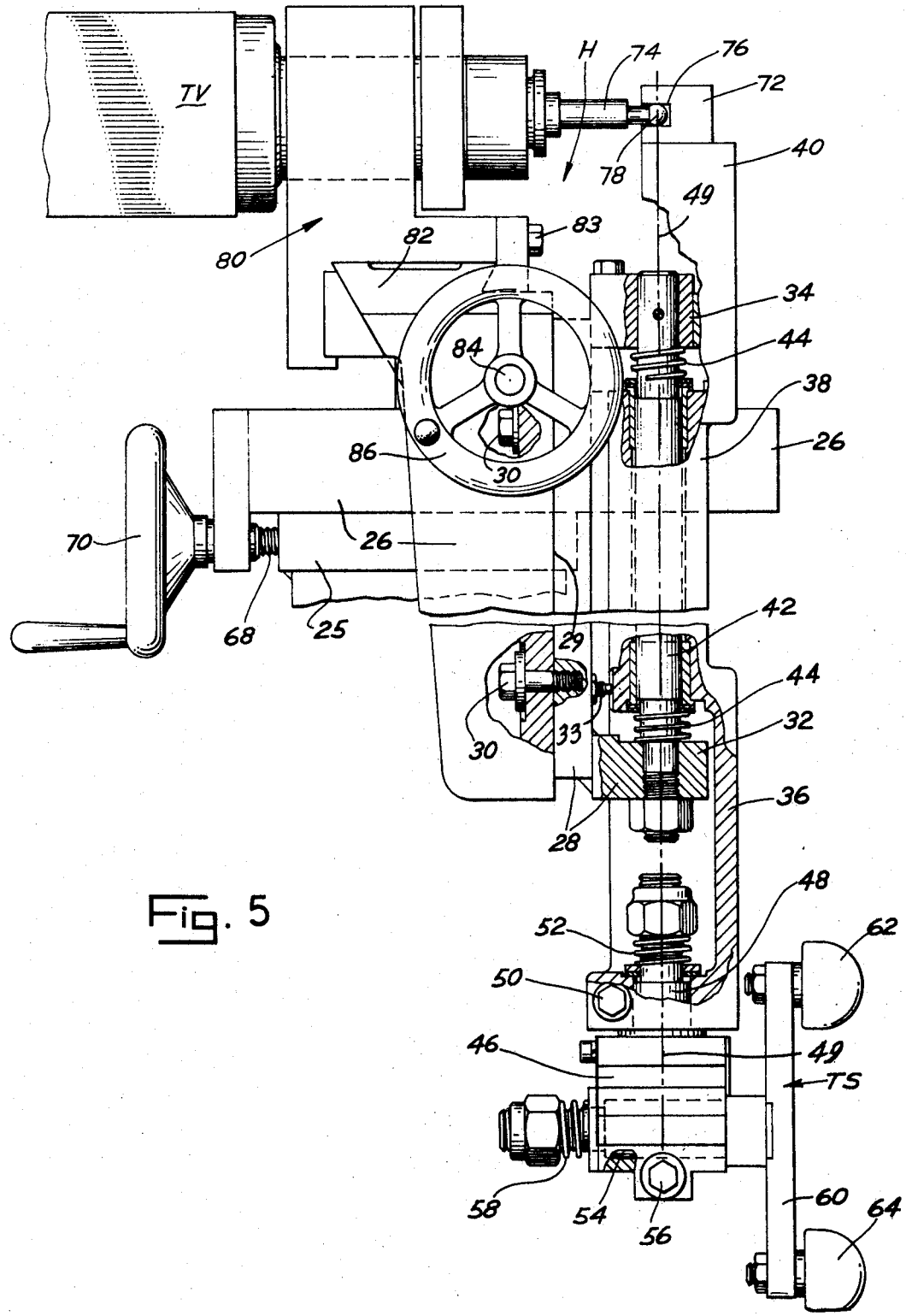
FIG. 5 is a front elevation of FIG. 3, parts thereof being shown in section on the line 5—5 of FIG. 3.

On the accompanying drawings, I have used a number of reference symbols, and a list follows:

TM—Table motor
TV—Tracer valve
H—Head
TS—Tracer stylus

SECTIONS OF VALVES,
FIGS. 4, 6, 7, 8 and 9
N—Neutral
F—Forward
R—Reverse
D—Down
U—Up FIG. 4 ONLY
P—Pump
T—Tank
SRV—Slow rate valve
RRV—Rapid rate valve
DS—Down solenoid
US—Up solenoid
RRS—Rapid rate solenoid
RRCV—Rapid rate control valve
SRCV—Slow rate control valve
RCV—Rate control valve for TM
TSV—Trace start and stop valve ARROWS IN FIGS. 6, 7, 8 and 9
f—forward
r—reverse Referring to FIGS. 1 and 2, some of the foregoing elements are disclosed and general views of the gear hardening machine are shown. A stationary vertical column 10 is mounted on a base 11, and a quench tank 12 is provided and adapted to contain quench liquid. A work piece supporting table is shown in FIG. 2 on which a work piece (large gear) 16 is shown in FIG. 1 and indicated by dash lines in FIG. 2. Also shown is a work piece 16a in the form of a pinion, the two sizes of the work pieces 16 and 16a in FIG. 2 illustrating the range for work pieces in the form of gears for the particular machine illustrated.

An induction intensifier 18 is shown for passage between two adjacent teeth of a gear, and such intensifier may be in the general form shown in Jones Patent No. 2,810,054. The induction intensifier 18 may be provided with side quench tubes such as shown in the co-pending application of Cunningham, Hall and Myers, Ser. No. 609,388 filed Jan. 16, 1967.

Ways 20 are shown in FIG. 2 for a carriage 21 to traverse, the carriage rotatably supporting the work piece supporting table 14 which is rotated relative to the carriage by the table motor TM, preferably of hydraulic reversible type. An adjusting screw 22 terminating in a hand wheel 24 is provided for adjusting the carriage 21 along the ways 20 toward and from the operator, whose position is indicated at "OPR." in FIG. 2, for instance to the far position shown for proper coaction of the intensifier 18 and the tracer stylus TS with the teeth of the pinion 16a, the operator being in front of the machine or at the bottom of FIG. 2. For any size gear it is desirable that the intensifier 18 be aligned with the vertical center line 23 shown in FIG. 2, and the tracer stylus aligned with another center line 27 as shown for the pinion 16a accomplished by certain adjustments of the position and angle of the tracer stylus TS, as will hereinafter appear.

A mounting base 25 for a tracer mechanism support 26 is carried by the head H, the head being vertically reciprocable with respect to the column 10 for scanning purposes involving both the tracer stylus TS and the induction intensifier 18 as will hereinafter appear.

The tracer mechanism support 26 carries a tracer stylus support 28 which may be vertically adjusted, a way connection between the two being provided as shown at 29 in FIG. 3 and the support 28 held in any desired adjusted position by a pair of clamp screws 30. The tracer stylus support 28 is provided with a lower hub 32 and an upper hub 34 as shown in FIG. 5 which carry a vertical rod 42 on which is vertically slidable a tracer stylus carriage having lower, middle and upper parts 36, 38 and 40 respectively. The tracer stylus carriage is floatingly mounted with respect to the hubs 32 and 34 and biased to a centered position by upper and lower centering springs 44 as shown. A tracer stylus mounting 46 is provided and has a pivot stud 48 which is rotatable therein and normally held against rotation by a clamp screw 50. A play take-up spring 52 is provided so that when the clamp screw 50 is loosened the pivot stud 48 may be rotated but any play in the parts will be taken up by the spring and thus eliminated before subsequent clamping of the screw 50.

A tracer stylus shaft 54 is rotatable in the tracer stylus mounting 46 and normaly clamped by a clamp screw 56. The shaft 54 is also provided with a play take-up spring 58. The shaft carries a tracer stylus crossarm 60 having an upper stylus knob 62 and a lower stylus knob 64 for tracing coaction with a surface of a work piece as will hereinafter appear. The clamp screw 56 may be loosened for permitting adjustment of the center line passing through the knobs 62 and 64 to either a vertical position for spur gears or to match the angle of the teeth in a helical gear. The tracer stylus carriage part 38 is held against rotation by slot-and-stud means, the stud being shown at 33, yet vertical floating movements are permitted. The adjustment 48 about the axis or center line 49 shown in FIG. 5 (and by dots 49 in FIGS. 2 and 3) is for the angle represented by the center line 27 in FIG. 2, or a center line 31 for the large gear 16, the axis 49 at that time being adjusted to another position such as indicated at 49a.

Referring to FIG. 3, the mounting base 25 for the tracer mechanism support 56 is adjustable toward and away from the operator by means of a suitable adjusting screw 66 shown in FIGS. 2 and 3 and provided with a suitable hand wheel (not shown). A lateral adjusting screw 68 shown in FIG. 5 is provided for adjusting the tracer mechanism support 26 relative to the mounting base 25. The screw 68 is provided with a hand wheel 70 for the purpose of rotating it.

For operating the tracer valve TV, an operating arm 72 is provided attached to the upper end of the tracer stylus carriage 36, 38, 40 and coacts with a tracer valve operating stylus 74, having a ball head 78 fitting in a slot 76 extending longitudinally of the arm 72. A tracer valve mounting 80 is provided slidable along a way 82 and clamped in any position therealong by clamp screws 83. A sensitivity adjusting screw 84 coacts between the tracer mechanism support 26 and the tracer valve mounting 80 for adjusting the tracer valve in a direction longitudinally of the operating arm 72 for less sensitivity as the ball 78 approaches the axis of swing 49 of the arm 72 and vice versa. The adjusting screw 84 is provided with a hand wheel 86 for manipulating the same. There is also shown an intensifier adjusting hand wheel 88 forming part of the induction heating apparatus for adjusting the intensifier 18 with respect to the gear gashes of the gears mounted on the work piece supporting table 14.

Figure 11:
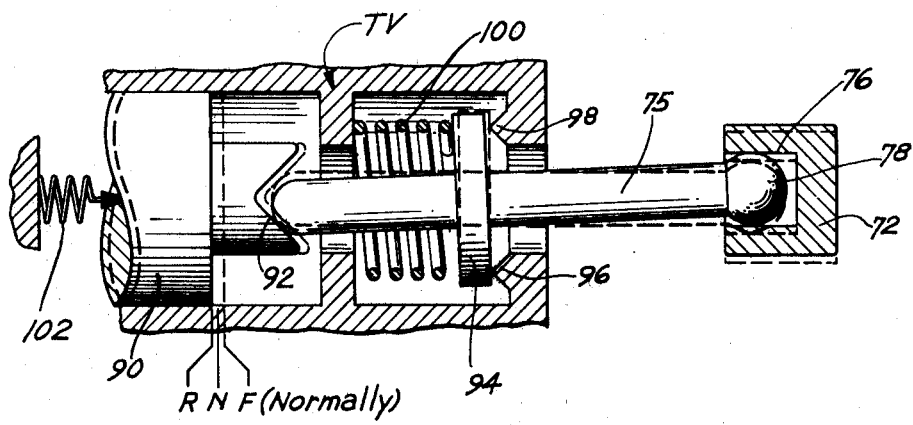
FIG. 11 is a diagrammatic sectional view taken on the line 11—11 of FIG. 3 to show one of two types of actuation of a tracer valve.

Referring to FIG. 11, a tracer valve spool 90 is shown and this spool is also diagrammatically shown in FIG. 4. FIG. 11 illustrates one type of action encountered in the operation of my gear hardening machine, to wit: elevation of the operating arm 72 from the dotted line position to the solid line position. Another type of action consists of the arm 72 while in the dotted line position swinging to the left in FIG. 1 for moving the spool 90 against the action of a return spring 102, for instance to a reverse position R (FIG. 4) from a forward position F which is the normal position of the spool as shown by dotted lines in FIG. 11. In moving from forward to reverse, the spool moves through the neutral position N of FIG. 4.

In the operation of my gear hardening machine, the gear is mounted on the supporting table 14 as by means of a lock nut 15 shown in FIG. 1 on a suitable arbor at the center of the table, and both the intensifier 18 and the tracer stylus TS are adjusted in relation to spaced teeth of the gear. The intensifier is adjusted to a position substantially midway between adjacent teeth such as those numbered 1 and 2 in FIG. 8 and the stylus knobs 62 and 64 are adjusted for contact with another tooth such as the right hand flank of the tooth numbered 4 as illustrated, the tracer valve TV being in the neutral position. Accordingly, during the scanning movement of the stylus and intensifier, whenever the stylus is in contact with tooth No. 4, the intensifier will be centered in the gash between the two teeth No. 1 and No. 2.

Figure 10:
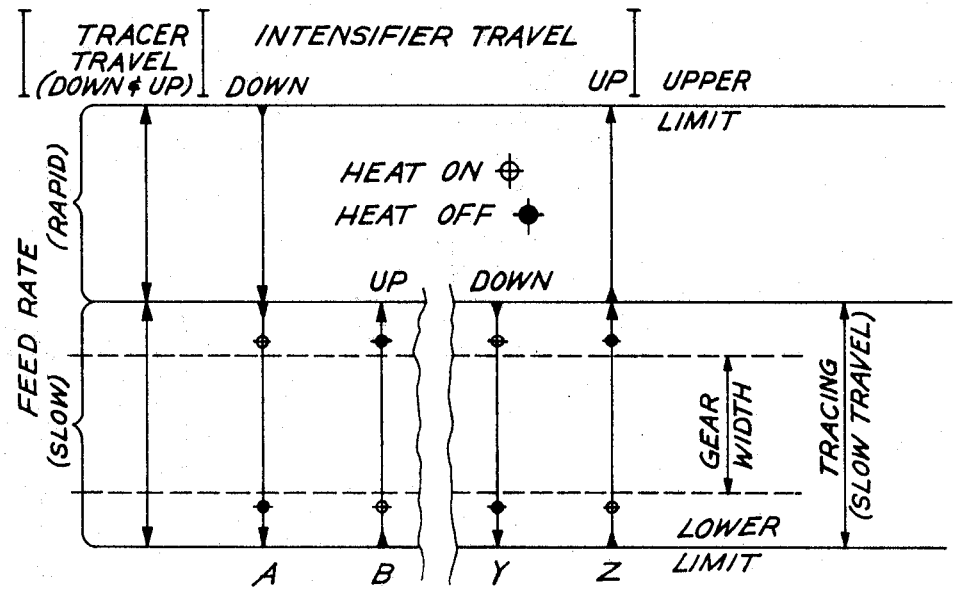
FIG. 10 is a diagram to illustrate certain sequential operations of my gear hardening machine.

The head H of the machine is then returned to the "UPPER LIMIT" depicted in FIG. 10, suitable controls are adjusted including a counter which is set for the number of teeth in the gear 16, and the valve TSV is opened for initiating a tooth hardening cycle which results in the pump P supplying hydraulic pressure through the valve TSV, the valve RCV and the valve TV to the forward port F of the table motor TM. Accordingly, the motor TM will move the gear 16 forwardly as indicated by f in FIG. 6 and the rate control valve RCV may be adjusted to control its speed of rotation. Initiating the cycle also starts the head H downwardly so that both the tracer and the intensifier first travel at a rapid feed rate as depicted in FIG. 10, and as the tracer knob 64 enters a gear gash, the feed changes to a slow rate, the foregoing operations being a standard sequence in a gear hardening machine of the character to which my invention is applied.

As the tracer stylus travels through the gear gash, it scans the gear width and accomplishes a constant adjustment of the surface being hardened with respect to the intensifier 18.

Figure 6:
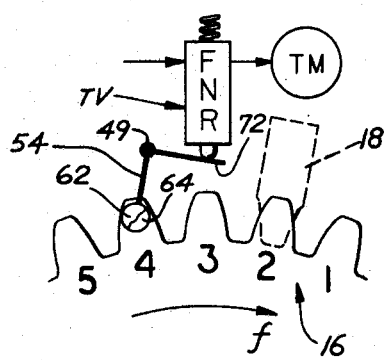
FIG. 6 is a diagrammatic view showing the position of certain parts of my gear hardening machine prior to a gear tooth hardening operation.
Figure 7:
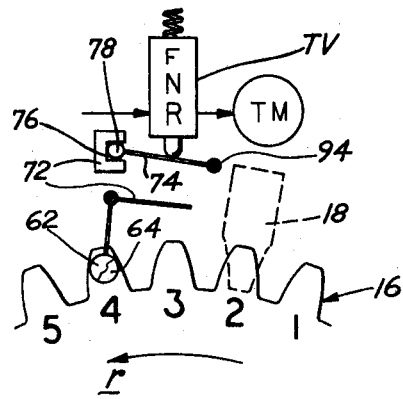
FIGS. 7, 8 and 9 are similar diagrammatic views showing other positions of the parts.

It may be, however, that the tracer stylus knob 64 will engage the end of a gear tooth such as the tooth numbered 4 in FIG. 7, and due to the floating mounting of the stylus knobs as described in connection with FIG. 5 the operating arm 72 will be elevated as shown in FIG. 11 for moving the tracer valve spool 90 from the forward position to the reverse position, thus causing the gear 16 which normally rotates in the forward direction *f* in FIG. 6 to reverse as in FIG. 7 and finally come to the position shown in FIG. 8 where the tracer knob 64 can enter the gear gash and thereafter scan the vertical right hand surface of the gear tooth numbered 4. At the same time the intensifier 18 scans the gear gash between the teeth numbered 1 and 2 and produces a hardening pattern shown at 104.

Figure 9:
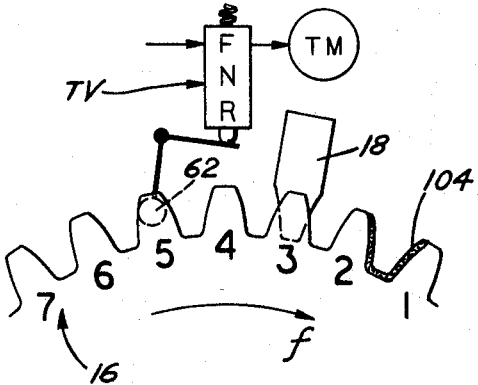

In FIG. 10 it will be noted the heat comes "ON" (the intensifier is energized with high frequency current) just before the intensifier enters the gear width and is turned "OFF" just after it leaves the gear width. The down travel of the intensifier is shown at A in FIG. 10. Subsequently, the intensifier as well as the tracer mechanism travel upwardly as shown at B in FIG. 10 and this time as shown in FIG. 9 the upper stylus knob 62 may engage the lower end of the gear numbered 5. If this happens, the tracer valve TV is again moved from the *f* position shown in FIG. 9 to the *r* position shown in FIG. 7, this time by depression of the arm 72 in FIG. 11 from the dotted line position which also moves the spool 90 toward the left the same as though the arm 72 were elevated. Thus the tracer mechanism is adjusted for scanning upwardly the right hand surface of the tooth numbered 5 during the upward travel indicated at B.

The down and up cycles according to the "TRACING (SLOW TRAVEL)" designation shown in FIG. 10 is repeated, A, B, C, D—X, Y, Z, etc. until the counter corresponds to the number of gear teeth at which time the tracer mechanism is given a signal to cause the tracer and intensifier to travel all the way up to the "UPPER LIMIT" shown in FIG. 10 according to the arrow at Z and the machine stops, ready for removing the gear 16 and replacing it with another one.

Referring to FIG. 4 the piston in the head cylinder HC connected to the head H accomplishes the down and up movements of the head and thereby the tracer stylus and the intensifier through the medium of the slow rate valve SRV and the rapid rate valve RRV. The up and down solenoids US and DS of the valve SRV and the rapid rate solenoid RRS of the valve RRV are energized in a proper sequence as common in the machine tool art to accomplish the desired sequence of travel and the details thereof are accordingly not shown. Rate control valves RRCV for the valve SRV and SRCV (two) for the valve RRV are provided in the circuit in addition to the rate control valve RCV for the table motor TM, and may each be manually adjusted.

Figure 8:
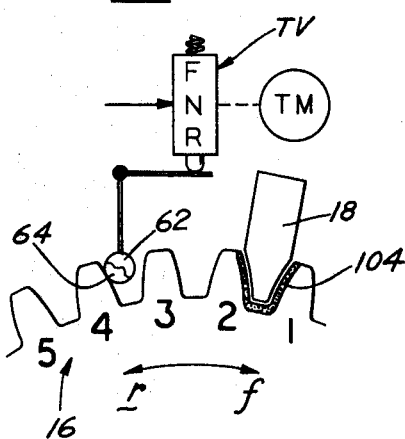

The tracing action is such that if the intensifier 18 is too close to the right flank of the gear numbered 2 in FIG. 8, the valve TV will move from the N position to the R position until correction is made. Conversely, if it is too far from the flank, the tracer valve TV will move from the N position to the F position to make correction. Thus constant correction is effected and I have found the tracing arrangement disclosed to be quite effective for constant and accurate centering of the intensifier 18 between the two teeth such as numbered 1 and 2 in FIG. 8.

In the event the gear being hardened is of the helical type, the stylus knobs 62 and 64 are adjusted to an angle such that the cross arm 60 is parallel to the gear gash and accordingly the tracer knobs can pass through the helical gear gash and will cause a constant correcting rotation of the gear during a scanning operation, either forwardly or reversely depending on whether the gash is at a right hand angle or a left hand angle, and in reverse order for up travel of the tracer stylus as distinguished from down travel thereof. The intensifier of course is made with angular surfaces to suit the helical teeth of the gear.

The purpose of having the two stylus knobs 62 and 64 is so that the knob 64 can enter the gear gash before the intensifier does on the down stroke and the knob 62 will remain therein after the intensifier leaves the bottom surface of the gear. Likewise in the reverse direction the knob 62 will enter the gear gash before the intensifier does and the knob 64 will leave the gash after the intensifier does.

While I have described my invention as operable in connection with the hardening of gear teeth, it is obvious that a suitably shaped intensifier may harden any other surface of a workpiece and the tracer stylus trace a similar surface spaced from the surface being hardened in order to properly relate the intensifier to the work in an obvious manner.

Some changes may be made in the construction and arrangement of the parts of my gear hardening machine without departing from the real spirit and purpose of my invention and it is my intention to cover by my claims any modified forms of structure or use of mechanical equivalents which may reasonably be included within their scope.

I claim as my invention:

1. An induction hardening machine comprising means for supporting a workpiece having at least a pair of projections having similar surfaces spaced from each other, a first one of said surfaces to be hardened, an induction intensifier for hardening said first surface, tracer means having a tracer element biased to engage the second one of said surfaces, said induction intensifier and said tracer means being fixed in relation to each other, control means selectively driving said work piece supporting means and thereby said first and second surfaces in forward and reverse directions, said control means being responsive to said tracer element being too far from or too close to said second surface so that said workpiece supporting means is driven whereby said first surface and said intensifier are maintained in a proper relationship during a hardening operation, and means for relatively moving said second surface and said tracer means throughout the length of said second surface and simultaneously therewith relatively moving said first surface and said induction intensifier whereby said intensifier effects hardening the length of said first surface.

2. An induction hardening machine according to claim 1 wherein said control means includes reversible power means, said control means being operable to control energization of said power means, said control means having forward and reverse positions which are assumed in response to said tracer element when said second surface is respectively too far from or too close to said tracer element, and having a neutral position which is assumed when said first surface is properly spaced in respect to said tracer element.

3. An induction hardening machine according to claim 1 wherein said control means includes a reversible hydraulic motor, said tracer means including a tracer valve having forward, neutral and reverse positions for controlling said reversible hydraulic motor, said forward position being assumed in response to said tracer element, when said second surface is too far from said tracer element, said neutral position being assumed when said second surface is properly spaced from said tracer element, and said reverse position being assumed when said second surface is too close to said tracer element.

4. An induction hardening machine according to claim 1 wherein said work piece has a plurality of equally spaced projections having surfaces to be successively hardened, and said induction intensifier successively hardens said surfaces.

5. An induction hardening machine as claimed in claim 1 wherein said means to effect hardening is a hydraulically operated unit, and a two position control valve for operating said unit causes hardening of said first surface in one direction when said control valve is in one of its two positions, and to cause hardening of a successive first surface in the opposite direction, when said control valve is in the other of its two positions.

6. An induction hardening machine as claimed in claim 1 wherein said tracer element is floatingly mounted on said tracer means and is biased to a predetermined position to permit continued movement of said tracer means as said tracer element engages one of said spaced projections preceding a hardening operation, and said tracer element being thereby operable to effect energization of said power means to relatively move said work piece supporting means and said tracer means to a position permitting said tracer element to properly engage one of said surfaces to be hardened.

7. An induction hardening machine as claimed in claim 6 wherein said tracer element has two surface engaging elements, one to pre-engage a surface being traced before said intensifier begins acting on a surface to be hardened and the other to post-engage said surface being traced after said intensifier ceases acting on said surface being hardened.

8. An induction hardening machine as claimed in claim 7 wherein said surface engaging elements are selectively positionable either aligned with the direction of movement of said tracer means or work piece projections having surfaces aligned with said direction of movement or aligned with a surface of said work piece which is at an angle relative to said direction of movement.

9. An induction hardening machine according to claim 1 wherein said work piece is a gear and said projections are gear teeth which are to be successively hardened, and said induction intensifier successively hardens a plurality of said gear teeth.

10. An induction hardening machine as claimed in claim 9 wherein said tracer element has two tooth flank engaging elements, one to pre-engage a gear tooth flank being traced before said intensifier begins acting on a tooth flank to be hardened and the other to post-engage said tooth flank being traced after said intensifier ceases acting on said tooth flank being hardened.

11. An induction hardening machine as claimed in claim 10 wherein said tooth flank engaging elements are selectively positionable either aligned with the direction of movement of said tracer means for a spur gear or aligned with a slanting tooth trough of a helical gear.

References Cited

UNITED STATES PATENTS

| | | | |
|---|---|---|---|
| 2,038,820 | 4/1936 | Anderson | 266—23 |
| 2,524,044 | 10/1950 | Denneen et al. | 148—147 X |
| 2,857,154 | 10/1958 | Jones | 266—4 |
| 2,958,619 | 11/1960 | Frost | 148—147 |

J. SPENCER OVERHOLSER, Primary Examiner

JOHN S. BROWN, Assistant Examiner

U.S. Cl. X.R.

148—128